US007936499B2

(12) United States Patent
Kim et al.

(10) Patent No.: US 7,936,499 B2
(45) Date of Patent: May 3, 2011

(54) METHOD AND APPARATUS FOR DRIVING EPD

(75) Inventors: Gwan-Hyung Kim, Seoul (KR); Joo-Hoon Lee, Yongin-si (KR); Sun-Tae Jung, Yongin-si (KR); Se-Jin Kim, Gimhae-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/683,733

(22) Filed: Jan. 7, 2010

(65) Prior Publication Data

US 2010/0172017 A1 Jul. 8, 2010

(30) Foreign Application Priority Data

Jan. 7, 2009 (KR) ........................ 10-2009-0001278

(51) Int. Cl.
*G02B 26/00* (2006.01)
*G09G 3/34* (2006.01)

(52) U.S. Cl. ........................................ 359/296; 345/107

(58) Field of Classification Search .................. 359/296; 345/107, 51, 78, 691–693; 430/32, 34, 38; 204/600, 450

See application file for complete search history.

(56) References Cited

U.S. PATENT DOCUMENTS

| | | | | |
|---|---|---|---|---|
| 7,656,384 | B2 * | 2/2010 | Saito | 345/107 |
| 7,817,133 | B2 * | 10/2010 | Zhou et al. | 345/107 |
| 2010/0020046 | A1 | 1/2010 | Nihei et al. | |

FOREIGN PATENT DOCUMENTS

| | | |
|---|---|---|
| WO | WO 2006/079957 | 8/2006 |
| WO | WO 2008/035740 | 3/2008 |

* cited by examiner

*Primary Examiner* — Ricky L Mack
*Assistant Examiner* — Tuyen Q Tra
(74) *Attorney, Agent, or Firm* — The Farrell Law Firm, P.C.

(57) ABSTRACT

A method and apparatus for driving an ElectroPhoretic Display (EPD) are provided, in which upon sensing a request for displaying data in a gradual graphic representation scheme, a plurality of segments for displaying the data are determined, a display changing order of the segments is determined, an inter-segment time interval is calculated, driving voltage pulses are applied to a first segment according to the display changing order, and driving voltage pulses are applied to each of the other segments at the inter-segment time interval after driving voltage pulses are applied to a previous segment according to the display changing order.

10 Claims, 4 Drawing Sheets

METHOD AND APPARATUS FOR DRIVING EPD

PRIORITY

This application claims priority under 35 U.S.C. §119(a) to a Korean Patent Application filed in the Korean Intellectual Property Office on Jan. 7, 2009 and assigned Serial No. 10-2009-0001278, the entire disclosure of which is hereby incorporated by reference.

BACKGROUND OF THE INVENTION

1. Field of the Invention

The present invention generally relates to an Electro-Phoretic Display (EPD), and more particularly, to a method and apparatus for driving an EPD to continuously display data.

2. Description of the Related Art

Recently, the concept of electronic paper has been introduced as a new display device which provides the advantages of a conventional display device and printed paper. Electronic paper is a kind of reflective display which offers the benefits of high resolution, a wide viewing angle, and a bright white background, similar to conventional paper and ink. Among display media, electronic paper has the most excellent visual characteristics and allows for implementation on any substrate of plastic, metal, paper, etc. Even when power is off, an image is maintained on the electronic paper. Due to the absence of a required backlight power supply in electronic paper, the battery lifetime of a mobile terminal is long, thus reducing cost and making it possible to realize a lightweight display. Like conventional paper, electronic paper can be realized over a wide area above all other displays. In addition, electronic paper has a memory function that maintains a displayed image despite a power-off condition.

Electronic paper can be implemented into an EPD. The EPD displays data in black or white according to voltages applied to both ends thereof. The EPD is configured by electrophoresis and microcapsules. A typical cell structure of the EPD is illustrated in FIG. 1. FIG. 1 is a sectional view illustrating the operational principle of the EPD. Referring to FIG. 1, the EPD is configured by forming transparent microcapsules each having black particles 40 and white particles 30 in a colored fluid, mixing the microcapsules with a binder 50, and positioning the mixture between upper and lower transparent electrodes 20 on a substrate 10. When a positive voltage is applied, negatively charged ink particles moves toward a surface, thus displaying the color of the particles. When a negative voltage is applied, the ink particles move downward, thus displaying the color of the fluid. In this manner, text or an image is displayed.

The EPD depends on the electrostatic migration of particles floating in a transparent suspending fluid. When a positive voltage is applied to the EPD, positively charged white particles 30 electrostatically moves toward electrodes near a viewer. The white particles 30 reflect light. On the contrary, if a negative voltage is applied to the EPD, the white particles 30 recede from the viewer and move to electrodes remote from the viewer and the black particles move to the top of the microcapsules, absorbing light. Hence, black is observed. Once particles move to certain electrodes, they are positioned at the same positions even if a voltage is eliminated after the movement. Thus, a bistable memory device can be achieved. Meanwhile, there are also electrophoretic capsules using a single type of particle. Specifically, white charged particles float in a fluid dyed with a dark color within a transparent polymer capsule.

The EPD having the foregoing configuration is a reflective display that makes a viewer comfortable as if he viewed contents printed on paper and has excellent visibility even in daylight. Owing to use of a bistable material, power is consumed only during changing displayed contents, thus making low-power operation possible. Accordingly, the EPD is widely used in displaying static contents, such as a large e-book or a signboard. Further, the EPD can be easily implemented on a curved plane as well as a flat plane due to the elasticity of the material. Therefore, the EPD has a potential for a wide range of applications.

However, since the EPD displays text or an image based on physical movements of colored particles, it has a low switching speed. As a result, the EPD has limitations in dynamic graphic representation. For example, the EPD is not effective in sophisticated dynamic representations such as changing the gray scale of each graphic so that the graphic gets dark gradually, while displaying a plurality of graphics successively at predetermined time intervals.

In contrast, a Liquid Crystal Display (LCD) has a fast response time and thus provides a natural dynamic graphic representation. Nonetheless, the LCD consumes much power and is difficult to be implemented on a curved plane.

SUMMARY OF THE INVENTION

An aspect of embodiments of the present invention is to address at least the problems and/or disadvantages and to provide at least the advantages described below. Accordingly, an aspect of embodiments of the present invention is to provide an EPD driving method and apparatus for enabling a dynamic graphic representation on an EPD.

Another aspect of embodiments of the present invention is to provide an EPD driving method and apparatus for displaying a variety of natural graphics on an EPD.

In accordance with an aspect of embodiments of the present invention, there is provided a method for driving an EPD in an EPD-having apparatus, in which upon sensing a request for displaying data in a gradual graphic representation scheme, a plurality of segments for displaying the data are determined, a display changing order of the segments is determined, an inter-segment time interval is calculated, driving voltage pulses are applied to a first segment according to the display changing order, and driving voltage pulses are applied to each of the other segments at the inter-segment time interval after driving voltage pulses are applied to a previous segment according to the display changing order.

BRIEF DESCRIPTION OF THE DRAWINGS

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
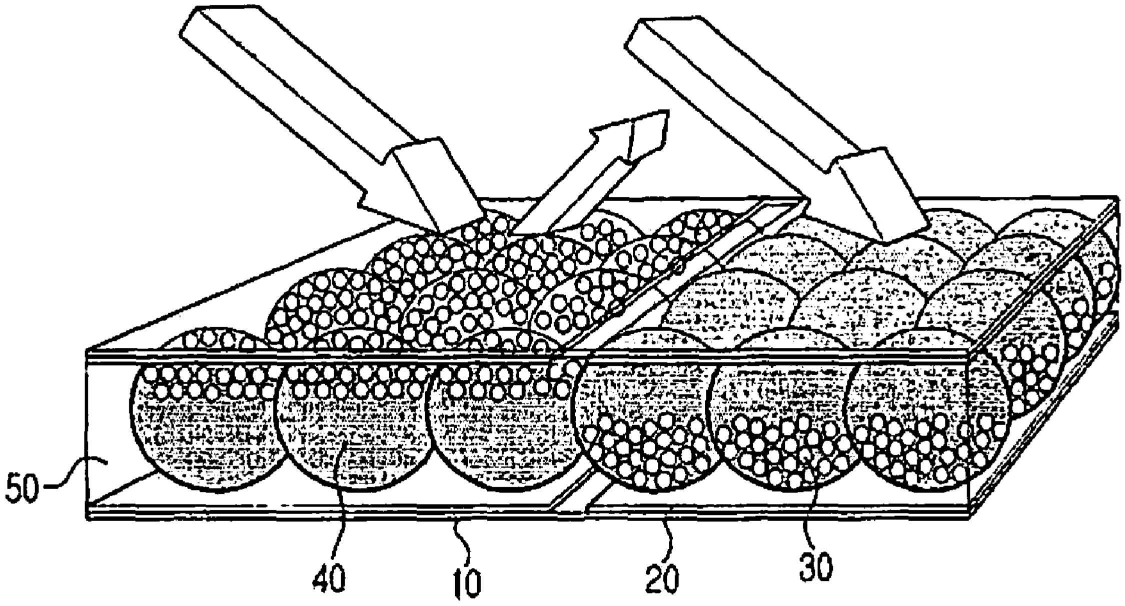
FIG. 1 illustrates a typical EPD structure.
Figure 2:
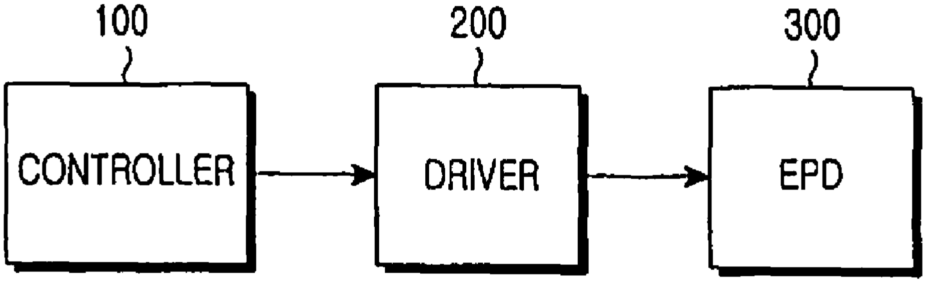
FIG. 2 is a block diagram of an EPD driving apparatus to which the present invention is applied.

The configuration of an EPD driving apparatus to which the present invention is applied is illustrated in FIG. 2. Referring to FIG. 2, the EPD driving apparatus includes a controller 100, a driver 200, and an EPD 300. The EPD driving apparatus may be incorporated in various electronic devices such as a portable phone, a Personal Digital Assistant (PDA), a laptop computer, an electronic book, etc.

Figure 3:
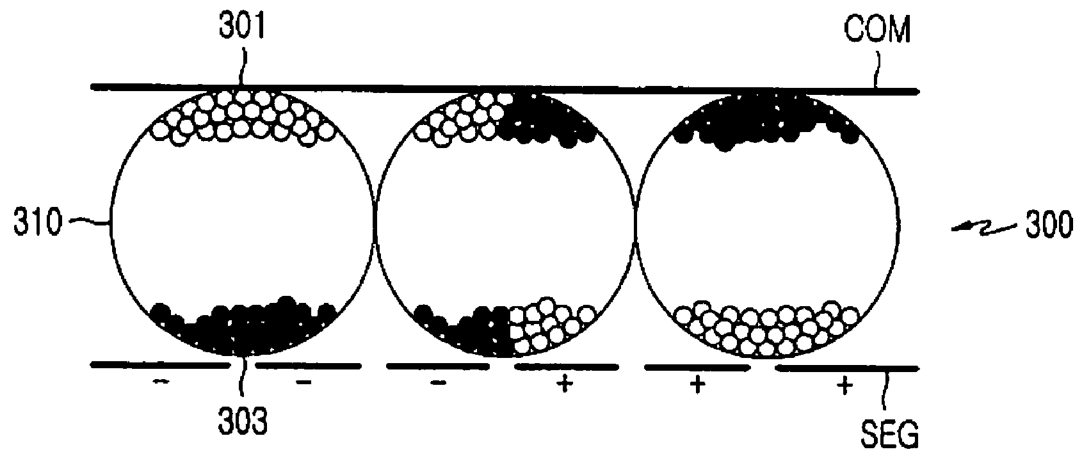
FIG. 3 illustrates the structure of an EPD according to an embodiment of the present invention.

The EPD 300 represents data in white or black according to voltages applied to both ends. FIG. 3 is a sectional view of the EPD 300. Referring to FIG. 3, the EPD 300 has a plurality of microcapsules 310 as electrophoretic devices between electrodes COM and SEG, each microcapsule 303 having white particles 301, black particles 303, and a fluid. According to an embodiment, a driving voltage is applied in the form of pulses to each electrode, and the color particles 301 and 303 move according to the potential difference between the voltages applied to the electrodes SEG (segment) and COM (common).

The controller 100 provides overall control to the EPD driving apparatus. The controller 100 determines data to be displayed on the EPD 300 and controls the operation of the driver 200 according to a determined data representation scheme.

The driver 200 applies a voltage as pulses to the electrodes of the EPD 300 under the control of the controller 100.

In the EPD driving apparatus having the above configuration, when data is to be displayed, the controller 100 determines a graphic representation scheme for the data. A gradual graphic representation scheme and an individual graphic representation scheme may be defined in an embodiment of the present invention.

The individual graphic representation scheme displays all segments corresponding to data to be displayed at the same time or displays another segment after one segment is completely displayed. The individual graphic representation scheme may be used in displaying a digit or character corresponding to a key input, for example.

A segment is a set of pixels for displaying a certain form on a display. For example, "1" may be represented in one or more segments, whereas the Korean character "j" may be represented in at least two segments. The size and shape of a segment are not predetermined and may vary according to data to be displayed. A time required for completely changing the display state of a segment from white to black or from black to white is referred to as a driving time. That is, to change the display state of a segment, a driving voltage is applied to a part of the electrode COM or SEG corresponding to the segment during the driving time. The driving time is constant irrespective of the area of the segment, generally 250 ms.

A conventional EPD displays data in the individual graphic representation scheme. Thus when a graphic is displayed using a plurality of segments, for example, when a circle is displayed in five sectors of a circle, the whole circle is displayed at a time or the circle is displayed by displaying one segment after another segment is completely displayed.

Figure 4:
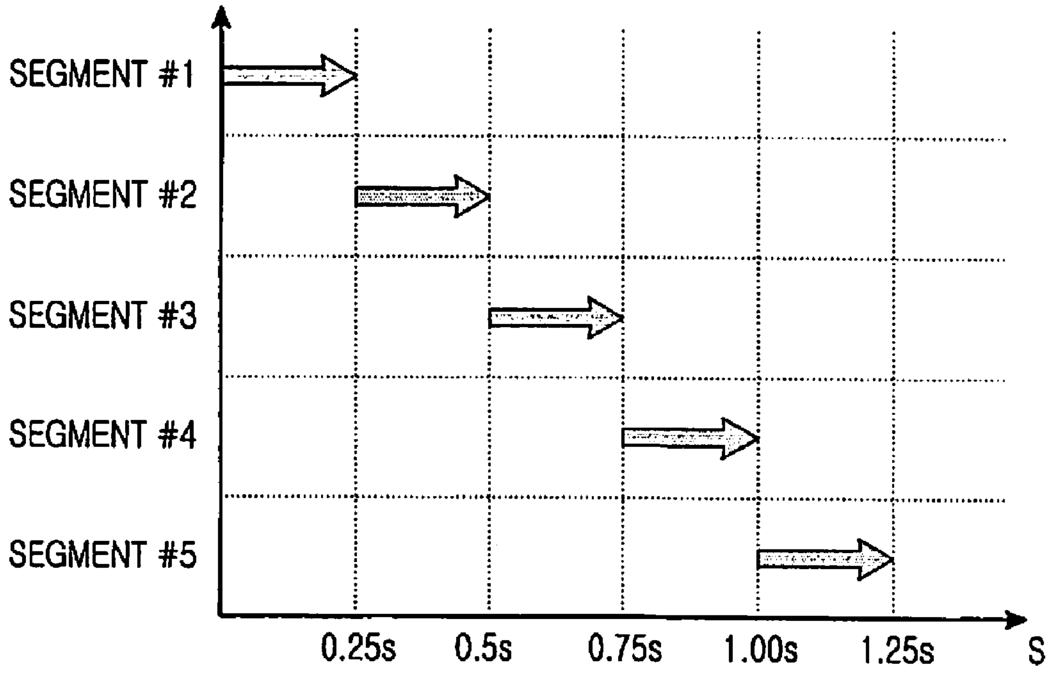
FIG. 4 is a diagram illustrating driving voltage pulse application durations in an individual graphic representation method according to an embodiment of the present invention.

Therefore, given a driving time of 250 ms, the sequential representation of a circle in five segments takes 1.25 s in total as illustrated in FIG. 4 because one segment is displayed after another segment is displayed. A user may become bored during the displaying time. Moreover, representation of a circle in more segments may decrease the efficiency of a device equipped with the EPD.

However, the gradual graphic representation scheme according to the present invention may allow for displaying data in various manners, while decreasing user inconvenience.

The gradual graphic representation scheme differentiates the start time points of displaying a plurality of segments corresponding to data to be displayed and starts to display one segment before another segment is fully displayed. Thus the EPD driving time is partially overlapped between segments. For example, when a circle composed of five sectors is to be displayed, displaying a segment starts and displaying another segment starts a predetermined time later. The predetermined time is shorter than the driving time.

Figure 5:
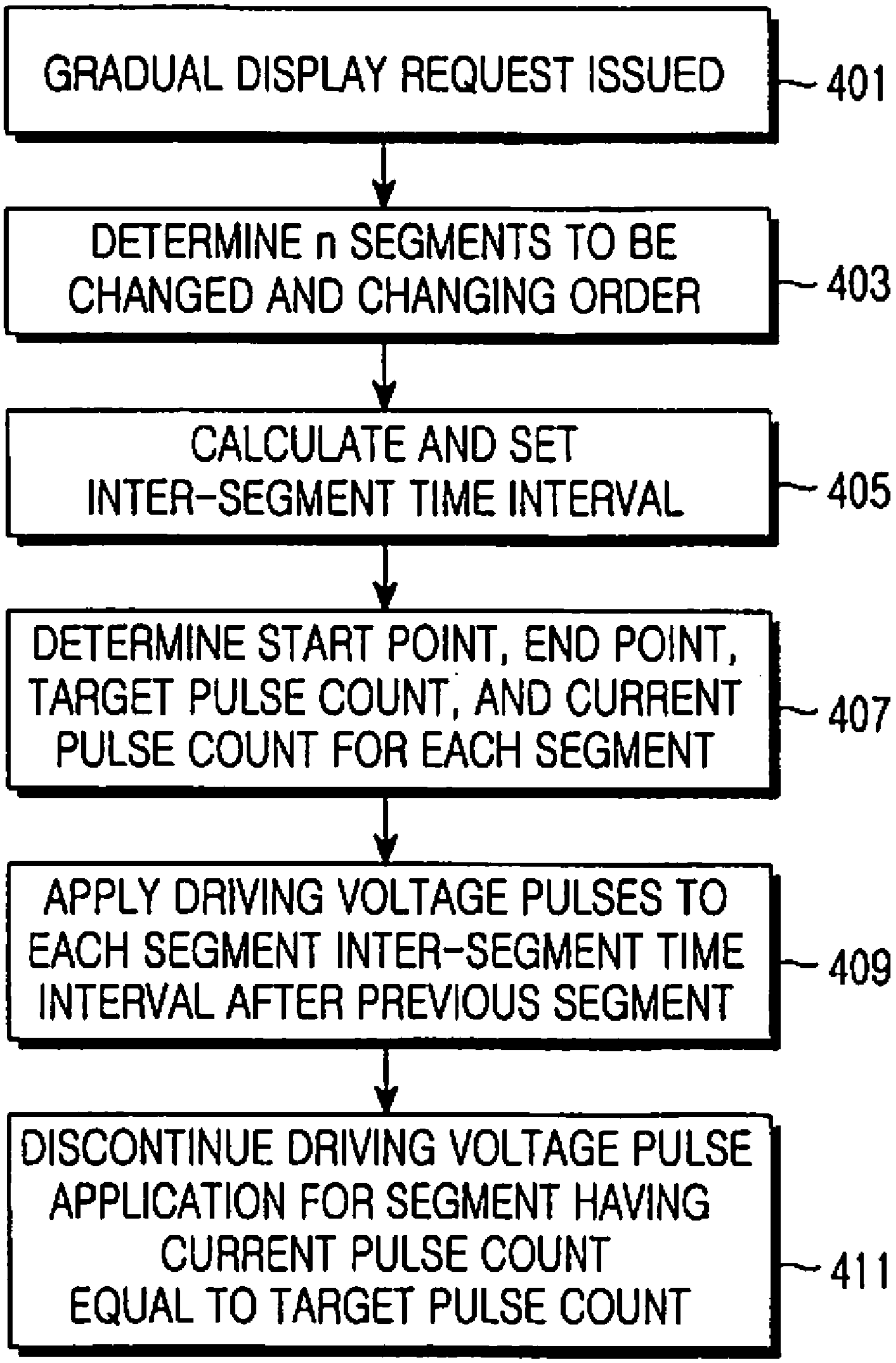
FIG. 5 is a flowchart illustrating a method for operating the EPD according to an embodiment of the present invention.

An operation of the controller 100 in the gradual graphic representation scheme is illustrated in FIG. 5. Referring to FIG. 5, when the controller 100 detects the graphic representation scheme of data to be displayed or data to be displayed in a changed manner as the gradual graphic representation scheme, it determines that a gradual display request has been generated in step 401. Thus the controller 100 determines a plurality of segments to be displayed differently according to the data and sets the changing order of the segments in step 403.

In step 405, the controller 100 calculates an inter-segment time interval between segments and sets the time interval. The inter-segment time interval refers to the difference between the starting display time points of successive segments, that is, the time difference between driving voltage application time points. The inter-segment time interval may be equal or different for all segments. Also, the inter-segment time interval may be determined based on the interval between display completion time points set for the data to be displayed.

The controller 100 determines the start point, end point, target pulse count, and current pulse count of each segment in step 407. The start and end points are information indicating the position and shape of the segment on the EPD 300. The current pulse count is the number of driving voltage pulses applied up to a current time. An initial current pulse count is 0. The target pulse count is the total number of driving voltage pulses that should be applied to the segment.

After applying driving voltage pulses to a first segment, the controller 100 applies driving voltage pulses to each of the following segments sequentially, a determined inter-segment time interval after the driving voltage pulse application time of the previous segment in step 409. To be more specific, a driving voltage pulse is applied to the second segment at a determined inter-segment time interval after the driving voltage pulse application time of the first segment, and a driving voltage pulse is applied to the third segment a determined inter-segment time interval after the driving voltage pulse application time of the second segment.

At the same time, the controller 100 checks the current pulse count and target pulse count of each segment in real time. The controller 100 discontinues applying a driving voltage pulse or changes the potentials of a voltage applied to the electrodes, for a segment for which the current pulse count is equal to the target pulse count in step 411. That is, the controller 100 applies the driving voltage pulses to each segment for a predetermined time and then discontinues the driving voltage application or changes potentials, thus changing a display state.

Figure 6:
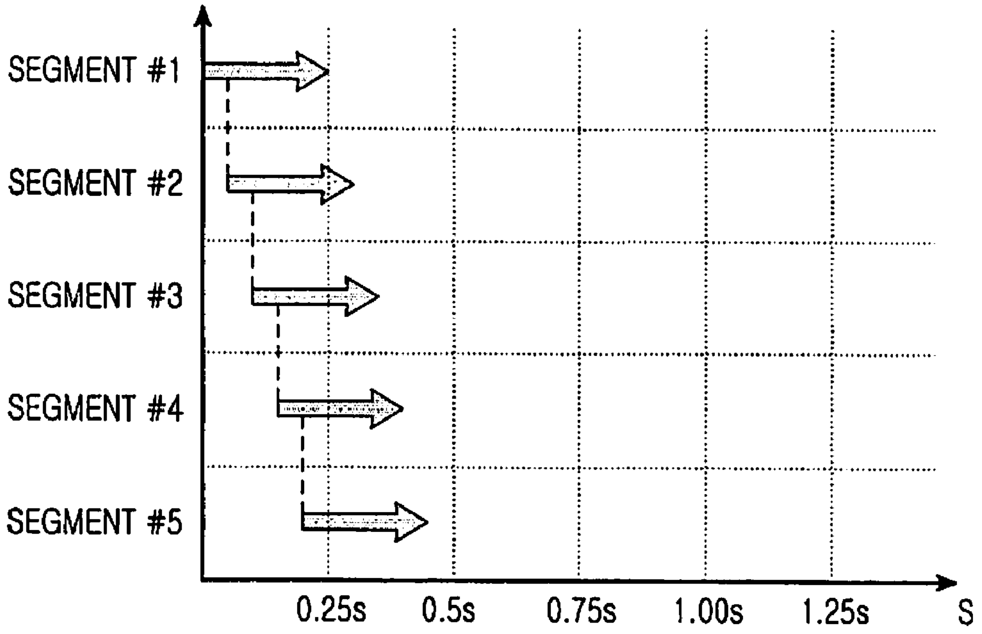
FIG. 6 is a graph illustrating driving voltage pulse application durations in a gradual graphic representation scheme according to an embodiment of the present invention.

FIG. 6 is a graph illustrating a time period during which driving voltage pulses are applied to five segments one after another at every interval of 50 ms in the gradual graphic representation scheme according to embodiments of the present invention. As noted from FIG. 6, a total display changing time is 450 ms.

Figure 7:
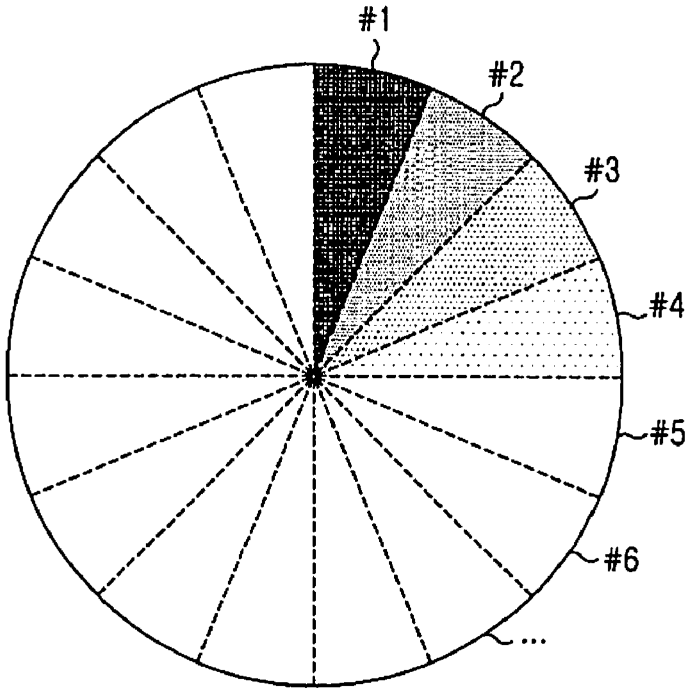
FIG. 7 illustrates data displayed in the gradual graphic representation scheme according to the embodiment of the present invention.

FIG. 7 illustrates a circle using 16 segments in the gradual graphic representation scheme according to the embodiment of the present invention. In FIG. 7, driving voltage pulses have been applied to four segments sequentially. Since the driving voltage pulses are applied to different segments at different time points, the gray scales of the segments are slightly different. If the driving voltage is applied as a plurality of short pulses, the gray scale difference between segments becomes more distinctive. In other words, the gray scale difference between segments is wider when the driving voltage is applied as periodic pulses during a driving time so that the driving voltage is interrupted periodically than when the driving voltage is continuously applied at the same level without interruptions. The periodic driving voltage pulse application may increase the driving time from 250 ms to (250 ms+interruption time periods). However, if the driving voltage interruption time is set to be short, the user may not perceive the increase of the driving time and data may be expressed with a sense of richness.

As is apparent from the above description, data is represented by improving the slow switching time of a segment-type EPD. Therefore, a fast feedback and a visual effect are provided to a user. Also, the EPD can find its use in a wide range and has an increased product value. As the EPD is driven according to the present invention, natural and various dynamic graphic representations are achieved on a display.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for driving an ElectroPhoretic Display (EPD) in an EPD-having apparatus, the method comprising:

sensing a request for displaying data in a gradual graphic representation scheme;

determining a plurality of segments for displaying the data and determining a display changing order of the segments;

calculating an inter-segment time interval; and applying driving voltage pulses to a first segment according to the display changing order and applying driving voltage pulses to each of the other segments at the inter-segment time interval after driving voltage pulses are applied to a previous segment according to the display changing order.

2. The method of claim 1, wherein applying the driving voltage pulses comprises applying driving voltage pulses to each of the segments for a predetermined time period, and wherein the inter-segment time interval is shorter than the predetermined time period.

3. The method of claim 1, wherein the inter-segment time interval is determined according to total time required for displaying the data, and wherein the driving voltage pulses are periodic.

4. The method of claim 1, wherein the inter-segment time interval is equal for each of the plurality of segments.

5. The method of claim 1, wherein the inter-segment time interval is different for each of the plurality of segments.

6. An apparatus for driving an ElectroPhoretic Display (EPD), comprising:

the EPD;

a driver for applying driving voltage pulses to the EPD; and a controller for, upon sensing a request for displaying data in a gradual graphic representation scheme, determining a plurality of segments for displaying the data, determining a display changing order of the segments, calculating an inter-segment time interval, applying driving voltage pulses to a first segment according to the display changing order, and applying driving voltage pulses to each of the other segments at the inter-segment time interval after driving voltage pulses are applied to a previous segment according to the display changing order.

7. The apparatus of claim 6, wherein driving voltage pulses are applied to each of the segments for a predetermined time period, and wherein the inter-segment time interval is shorter than the predetermined time period.

8. The apparatus of claim 6, wherein the inter-segment time interval is determined according to total time required for displaying the data, and wherein the driving voltage pulses are periodic.

9. The apparatus of claim 6, wherein the inter-segment time interval is equal for each of the plurality of segments.

10. The apparatus of claim 6, wherein the inter-segment time interval is different for each of the plurality of segments.

* * * * *